G. R. NELSON.
POWER ATTACHMENT.
APPLICATION FILED MAY 29, 1922.

1,428,651.

Patented Sept. 12, 1922.

Inventor
GEORGE R. NELSON

By A. E. Carleen
Attorney

UNITED STATES PATENT OFFICE.

GEORGE R. NELSON, OF CENTER CITY, MINNESOTA.

POWER ATTACHMENT.

Application filed May 29, 1922. Serial No. 564,359.

*To all whom it may concern:*

Be it known that I, GEORGE R. NELSON, a citizen of the United States, residing at Center City, in the county of Chisago and State of Minnesota, have invented certain new and useful Improvements in Power Attachments, of which the following is a specification.

This invention relates to power attachments for automobiles and the main object is to provide a simple, efficient, practical and easily attached and detached device for transmitting power from an automobile to other belt driven machinery. Further objects will be disclosed in the course of the following specification and are clearly illustrated in the accompanying drawing, wherein.

Figure 1:
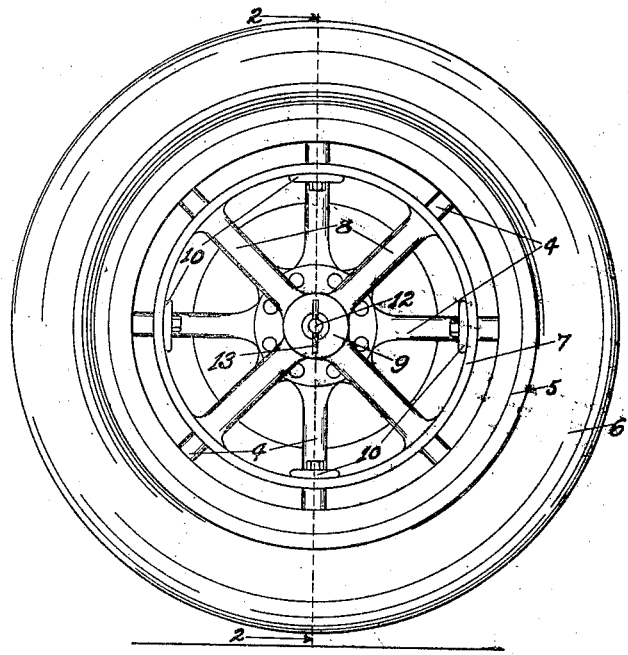
Fig. 1 is an elevation of a rear wheel of a motor vehicle, showing my attachment as applied thereto.
Figure 2:
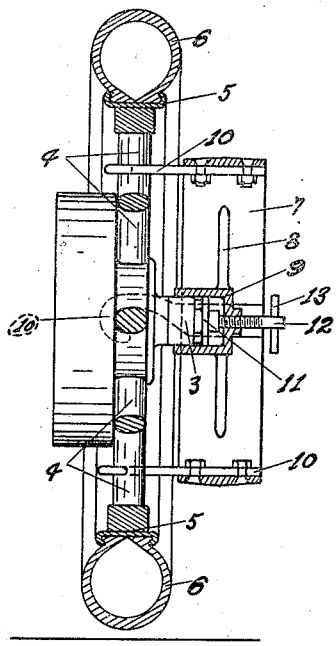
Fig. 2 is substantially a vertical, diametrical section on the line 2—2 in Fig. 1.

Referring to the drawing by reference characters 3 designates the hub of an automobile wheel having spokes 4, a felly 5 and a tire 6, all of common and well known construction.

The power attachment consists of a belt pulley 7 having integrally formed spokes 8 and hub cup 9, the latter of which is made of a size to snugly center and slide on the hub 3. Secured upon the inside of the pulley rim 7 are a number of hooks 10, which are adapted to simultaneously hook over the spokes 4 and hold the pulley in toward the wheel. A securing plate 11 is slidable in the cup 9 and is actuated by a threaded bar 12, which may be turned by a pin 13 or some other suitable means. Thus, after first placing the cup 9 over the hub 3, to center the pulley concentrically with the wheel, and hooking the hooks 10 over corresponding spokes 4, by turning up the bolt or bar 12 the plate 11 will be forced in against the hub until the pulley is rigidly secured in place on the wheel. With the pulley then connected up by a belt (not shown) it will be understood, that with the wheel jacked up, the automobile can be used to drive stationary machinery in a convenient and practical manner.

It is further understood that suitable modifications may be made in the design and structural details of this device, provided, however that such modifications come within the spirit and scope of the appended claims. Having now therefore fully shown and described my invention, what I claim to be new and desire to protect by Letters Patent is:

1. A power attachment for an auto-vehicle wheel consisting of a pulley having an integrally formed hub cap adapted to slidably and concentrically engage the hub of the wheel, hooks near the periphery of the pulley for engagement with the spokes of the wheel, and means operative against the hub of the wheel for forcing the pulley outwardly against the resistance of said hooks.

2. A power attachment for a motor-vehicle wheel consisting of a pulley having an integrally formed hub cup adapted to slidably and concentrically engage the hub of the wheel, a member within the cup adapted to engage against the hub, means for actuating the member, and detachable means for rigidly connecting the pulley to the spokes of the wheel.

3. A device of the class described consisting of a pulley having means around the rim thereof for securing it to a vehicle wheel, a hub cup formed integrally and concentrically with the rim of the pulley for slidable engagement with the hub of the wheel, hand operated means within the cup for adjustably securing it with respect to the hub, substantially as set forth.

In testimony whereof I affix my signature.

GEORGE R. NELSON.